(12) United States Patent
Davis et al.

(10) Patent No.: US 6,873,420 B2
(45) Date of Patent: Mar. 29, 2005

(54) TOPOGRAPHICAL MEASUREMENT MACHINE FOR BOWLING LANES AND THE LIKE

(75) Inventors: Dennis Davis, Sebring, FL (US); Anthony Crews, Sebring, FL (US); John Davis, Sebring, FL (US); Mark Davis, Sebring, FL (US)

(73) Assignee: Kegel, LLC, Lake Wales, FL (US)

( * ) Notice: Subject to any disclaimer, the term of this patent is extended or adjusted under 35 U.S.C. 154(b) by 203 days.

(21) Appl. No.: 10/138,471

(22) Filed: May 3, 2002

(65) Prior Publication Data

US 2003/0206304 A1 Nov. 6, 2003

(51) Int. Cl.⁷ .................... G01B 11/24; G01B 11/26; G01B 11/30; G01B 21/22; G01C 1/00
(52) U.S. Cl. .................. 356/601; 356/139.1; 33/285; 33/533
(58) Field of Search .................. 356/600–613, 356/138, 139.1, 141.2, 147, 152.1, 152.3, 153; 473/54; 427/8, 9, 10; 33/286, 293, 505, 775, 121, 122, 290, 295, 276, 278, 279–282, 285, 340, 501, 533; 250/559.19, 559.22, 559.37, 559.4, 559.42

(56) References Cited

U.S. PATENT DOCUMENTS

| | | | | | |
|---|---|---|---|---|---|
| 2,161,704 | A | * | 6/1939 | Foster | ............................ 33/340 |
| 3,662,258 | A | * | 5/1972 | Murphy et al. | ............... 324/227 |
| 3,826,576 | A | * | 7/1974 | Stewart | ........................ 356/391 |
| 4,437,010 | A | * | 3/1984 | Scheie et al. | .............. 250/459.1 |
| 4,471,530 | A | * | 9/1984 | Kirven | ........................... 33/505 |
| 4,487,788 | A | * | 12/1984 | Scheie et al. | .................... 427/9 |
| 5,185,901 | A | * | 2/1993 | Davis et al. | ..................... 15/98 |
| 5,501,097 | A | * | 3/1996 | Nomura | ........................... 73/9 |
| 5,521,393 | A | | 5/1996 | Burkholder et al. | |
| 5,717,220 | A | | 2/1998 | Burkholder et al. | |
| 5,859,783 | A | * | 1/1999 | Ytterberg et al. | ............... 702/54 |
| 5,935,333 | A | | 8/1999 | Davis | |
| 6,583,869 | B1 | * | 6/2003 | Sheridan | ....................... 356/153 |
| 2002/0166971 | A1 | * | 11/2002 | Burns et al. | .............. 250/341.8 |

* cited by examiner

Primary Examiner—Zandra V. Smith
Assistant Examiner—Gordon J. Stock, Jr.
(74) Attorney, Agent, or Firm—Hovey Williams LLP

(57) ABSTRACT

An automated lane surface measuring device comprising a controller for operating a drive mechanism for propelling the measuring apparatus and one or more sensors operated by the controller to measure topographical parameters of the bowling lane surface. In one embodiment the apparatus measures bowling lane surface elevation by measuring bowling lane height with respect to the measuring apparatus in selectable increments along the surface of the bowling lane. The measuring apparatus may also measure crosswise tilt along the width of a bowling lane in selectable increments. The measuring apparatus may also measure lengthwise tilt of the length of the lane surface in selectable increments.

10 Claims, 6 Drawing Sheets

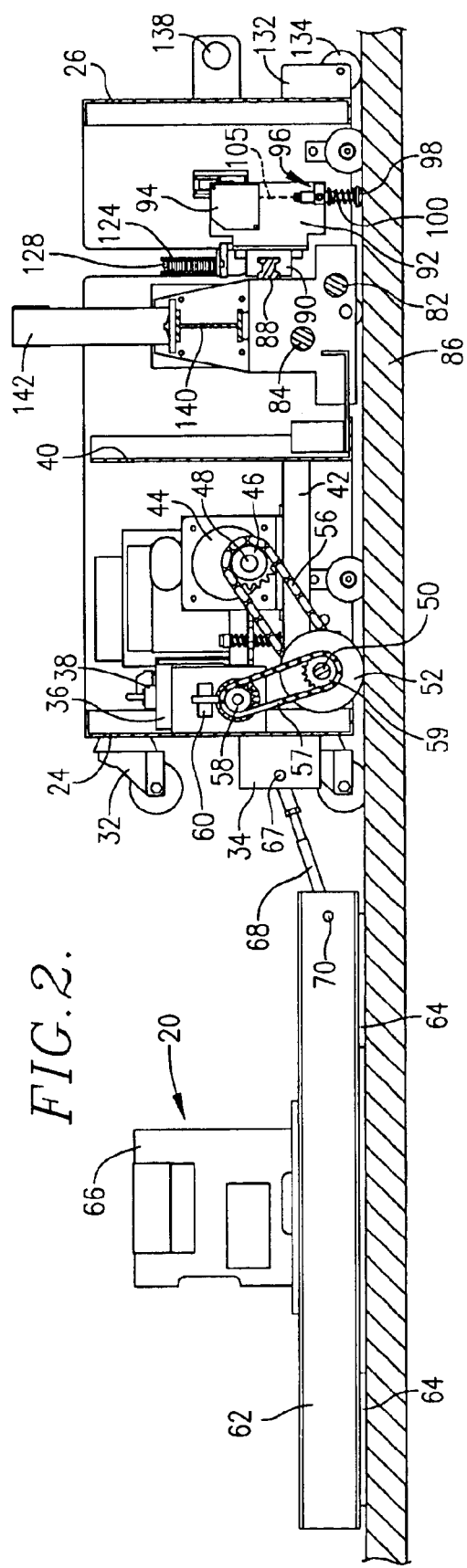
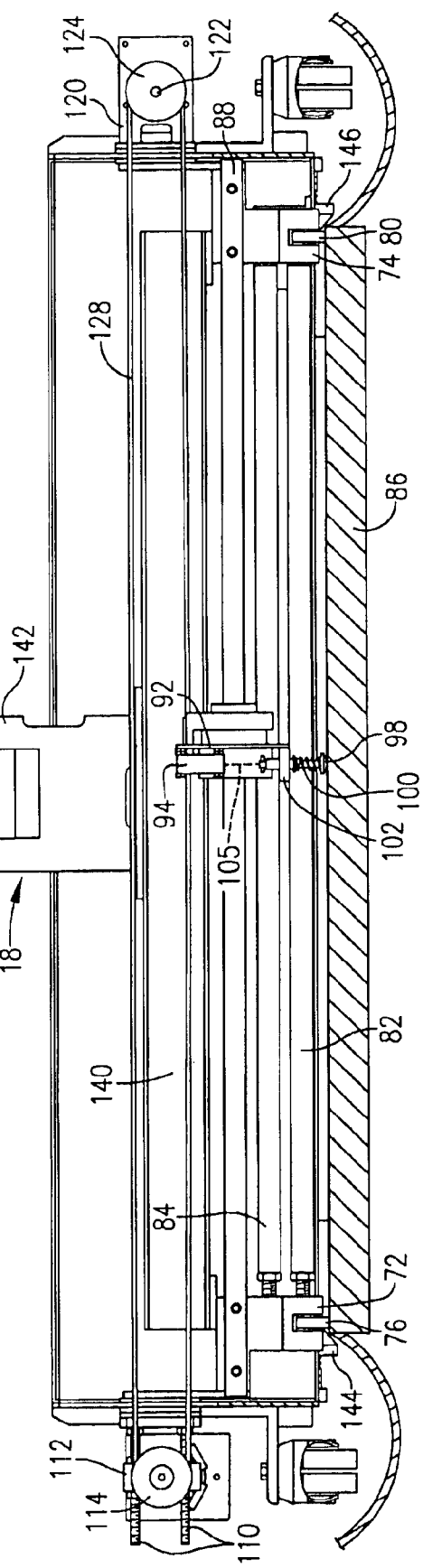
FIG. 2.
FIG. 3.

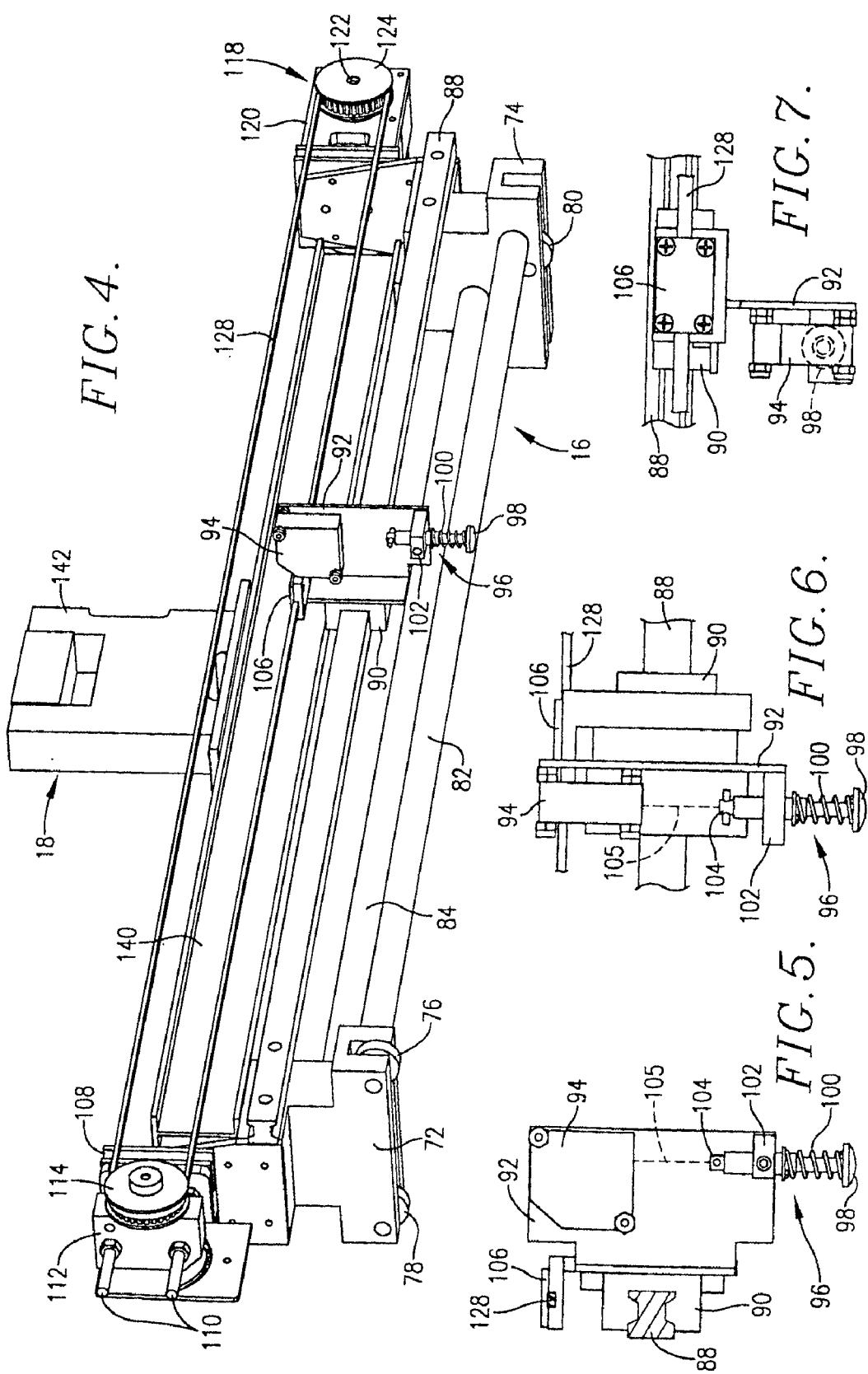

TOPOGRAPHICAL MEASUREMENT MACHINE FOR BOWLING LANES AND THE LIKE

A computer program listing appendix containing the source codes of two computer programs that may be used in conjunction with the present invention is incorporated herein by reference and appended hereto as one (1) original compact disk, and an identical copy thereof, containing a total of fifteen (15) files as follows:

Directory of D:\Laptop

| Filename | Size/Type | Modified |
|---|---|---|
| Anamoli1.txt | 2KB Text Document | Feb. 20, 2002 9:32 AM |
| Chart3D.txt | 37KB Text Document | Feb. 20, 2002 9:32 AM |
| FormChart2D.txt | 8KB Text Document | Feb. 20, 2002 9:32 AM |
| FormChartHistory.txt | 16KB Text Document | Feb. 20, 2002 9:32 AM |
| FormDiffFrame.txt | 1KB Text Document | Feb. 20, 2002 9:32 AM |
| FormGenericPass.txt | 1KB Text Document | Feb. 20, 2002 9:32 AM |
| FormMainMap.txt | 43KB Text Document | Feb. 20, 2002 9:32 AM |
| FormManual.txt | 15KB Text Document | Feb. 20, 2002 9:32 AM |
| FormPerReadPerLane.txt | 22KB Text Document | Feb. 20, 2002 9:32 AM |
| FormStart.txt | 4KB Text Document | Feb. 20, 2002 9:32 AM |
| FormWholeLane.txt | 4KB Text Document | Feb. 20, 2002 9:32 AM |
| ModuelUtilities.txt | 4KB Text Document | Feb. 20, 2002 9:32 AM |
| ReportAnamoli.txt | 2KB Text Document | Feb. 20, 2002 9:32 AM |
| WaveClass.txt | 12KB Text Document | Feb. 20, 2002 9:32 AM |

Directory of D:\PLC

| Filename | Size/Type | Modified |
|---|---|---|
| KegMapManualHX44_13_08_31_2001.opt | 4KB OPT File | Feb. 20, 2002 9:33 AM |

TECHNICAL FIELD

The present invention relates to the field of bowling lane maintenance machines. More particularly, the invention relates to a computer driven apparatus to measure topographical parameters of a bowling lane surface for later use in bowling lane maintenance applications.

BACKGROUND

In the prior art, automated machines for measuring relatively precise topographical parameters of a bowling lane surface are unknown. There are automated machines for measuring the profile of lane conditioning oil which has been laid down on top of the surface of a bowling lane. One such prior art reference is U.S. Pat. No. 5,717,220, which discloses a machine for automatically measuring the profile of lane dressing on a bowling lane. In the '220 patent, a sample of lane dressing taken from the lane is optically analyzed to determine the thickness of the application of the lane dressing from end board to end board. However, this analysis provides no information regarding the actual surface of the bowling lane itself, which sits beneath the dressing fluid.

While machines such as those disclosed in the '220 patent can provide information regarding the profile and pattern of dressing fluid that has been deposited on a lane, they provide no information regarding the bowling lane surface and hence the oil pattern that should be applied to the lane to ensure a fair application of lane dressing for a single lane or for an entire facility. Moreover, the apparatus disclosed in the '220 patent does not provide information that may be later used while repairing or resurfacing a lane.

In the prior art lane topographical measurements have been taken using a manual apparatus that employs a feeler gauge to display lane height. This machine was not automated. It is desirable then to provide a machine that will automatically measure one or more parameters of lane topography to provide information for lane maintenance procedures and applications.

SUMMARY OF THE INVENTION

The bowling lane measuring apparatus of the present invention solves the prior art problems discussed above and provides a distinct advance in the state of the art. More particularly, the invention allows the automated measurement of topographical features of a bowling lane surface that may be used in bowling lane maintenance for applications such as applying conditioning oil to a bowling lane, resurfacing a bowling lane, and others. The invention measures one or more of a plurality of parameters describing bowling lane surface topography including lane surface elevation, cross-wise tilt, and lengthwise tilt of the lane.

The preferred embodiment of the present invention includes a controller for operating a drive mechanism that propels the measuring apparatus, and one or more sensors operated by the controller to measure topographical parameters of the bowling lane surface. In one preferred aspect, the apparatus measures bowling lane surface elevation by measuring bowling lane height with respect to the measuring apparatus in selectable increments along the surface of the bowling lane. In another preferred aspect of the invention, the measuring apparatus measures crosswise tilt along the width of a bowling lane in selectable increments. In another preferred aspect of the invention, the measuring apparatus measures lengthwise tilt of the length of the lane surface in selectable increments. These and other aspects of the invention are described more fully in the detailed description below.

BRIEF DESCRIPTION OF THE DRAWINGS

A preferred embodiment of the invention is described in detail below with reference to the attached drawing figures, wherein like reference numerals designate the same or similar parts throughout the several views:

FIG. 2 is a side elevational view of one embodiment of the lane mapper of the present invention sitting on a bowling lane with the near side wall of the machine removed to reveal internal details;

FIG. 3 is a front elevational view of one embodiment of the lane mapper of the present invention sitting on a bowling lane with the wall removed;

FIG. 4 is a bottom perspective view of a portion of one embodiment of the lane mapper of the present invention including the lane height detection sensor and crosswise tilt sensor;

FIG. 5 is an enlarged, fragmentary cross sectional side view of the lane height detection sensor assembly;

FIG. 6 is a fragmentary, front elevational view of the lane height sensor assembly;

FIG. 7 is a fragmentary, top plan view of the lane height sensor assembly;

FIG. 8 is a fragmentary, top plan view of a portion of one embodiment of the lane mapper of the present invention;

DETAILED DESCRIPTION

Figure 1:
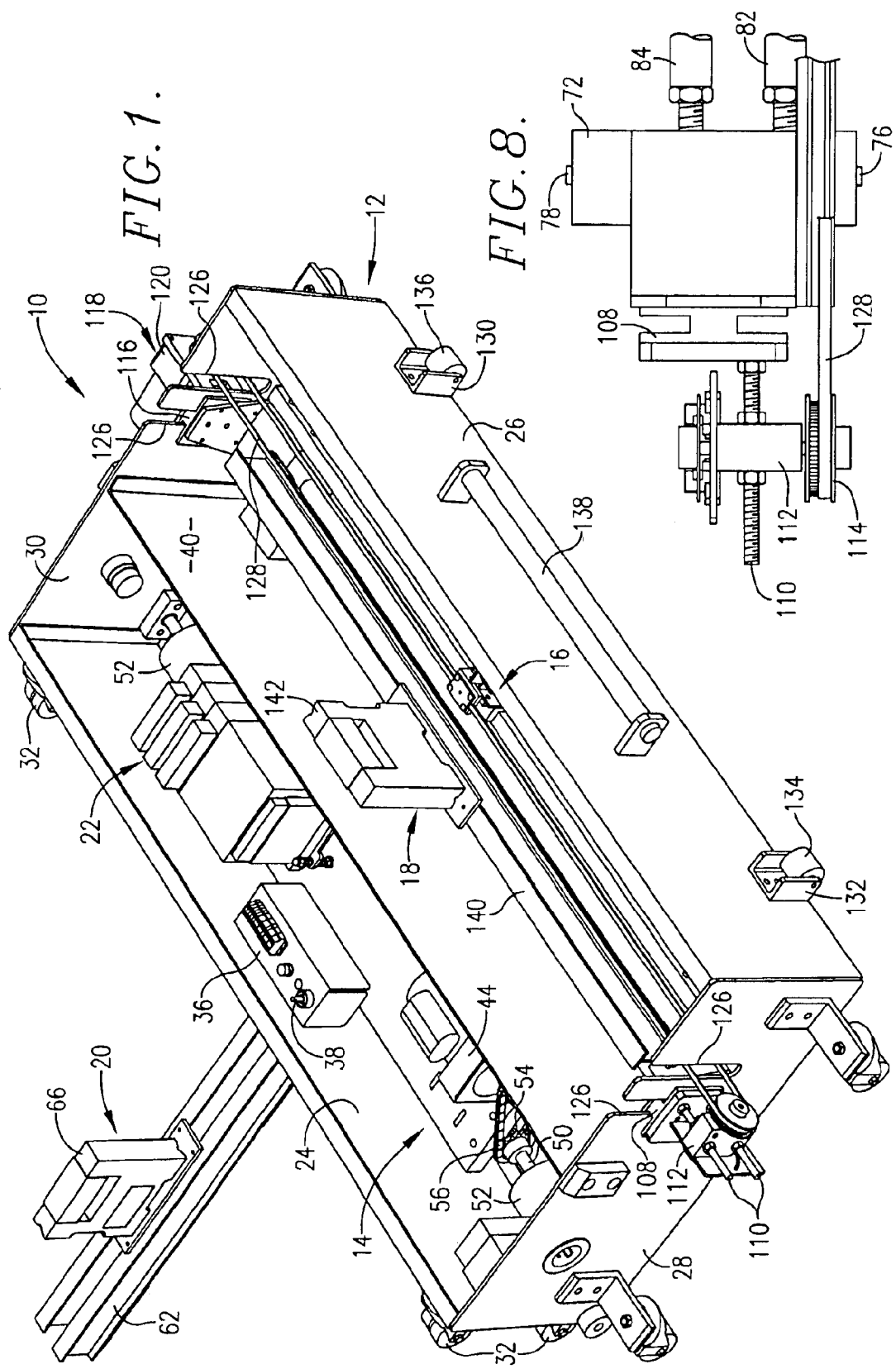
FIG. 1 is a top front perspective view of one embodiment of the lane mapper of the present invention.

A preferred embodiment of the bowling lane measurement apparatus of the present invention, referred to as a lane mapper, is indicated to by the numeral 10 in FIG. 1. Apparatus 10 broadly includes housing 12, drive assembly 14, lane height measurement assembly 16, crosswise tilt measurement assembly 18, lengthwise tilt measurement assembly 20, and controller assembly 22.

Referring to FIG. 1, housing 12 includes rear wall 24, front wall 26, side wall 28, side wall 30, and a top door that is not shown. Rear wall 24 has four caster wheels 32 mounted at the four corners thereof for rollably supporting apparatus 10 in the storage position with apparatus 10 tipped on its rear end. Rear wall 24 also has a centrally disposed, rearwardly projecting mounting bracket 34 (FIG. 2) for receiving a rearwardly projecting lengthwise tilt assembly mounting arm 68. Also attached to rear wall 24 internally of housing 12 is power distribution assembly 36 including a power switch 38 mounted thereon. Between rear wall 24 and front wall 26 and mounted to side walls 28 and 30 is a transverse dividing wall 40. Mounted between dividing wall 40 and rear wall 24 is a single speed drive motor 44, and, a controller assembly 22.

Drive assembly 14 includes drive motor 44 with drive sprocket 46 mounted on the output shaft 48 of motor 44. (FIG. 2) Drive assembly 14 further includes a long drive shaft 50 extending transversely between and journalled by left and right walls 28, 30 with two drive wheels 52 mounted adjacent the opposite ends thereof. A driven sprocket 54 fixed to drive shaft 50 in alignment with drive sprocket 46 receives driving power from drive sprocket 46 via an endless chain 56. A notched counter wheel 58 (FIG. 2) is operably coupled with the left end of drive shaft 50 by means of a chain 57 that is turned by a sprocket 59 fixed to shaft 50. A photoelectric sensor 60 (FIG. 2) senses the rotation of notched wheel 58 and is used for indicating the distance of travel of apparatus 10. Sensor 60 is in electrical communication with controller assembly 22.

Referring to FIG. 2, lengthwise tilt measurement assembly 20 includes a fore-and-aft mounting beam 62 with two skid pads 64 affixed to the bottom thereof. Mounted to the top of beam 62 is a sensor in the form of digital level 66, which is in electrical communication with controller assembly 22. Mounting beam 62 is attached to bracket 34 by arm 68. A transverse pivot 67 secures arm 68 to bracket 34 and allows for vertical displacement of lengthwise tilt measurement assembly 20. Likewise, a transverse pivot 70 secures the opposite end of arm 68 to mounting beam 62 and allows for vertical displacement of the assembly.

Lane height measurement assembly 16, as best seen in FIG. 4, includes a wheel housing 72 and a wheel housing 74. Rotatably mounted within housing 72 are two fore-and-aft aligned wheels 76 and 78. Rotatably mounted in wheel housing 74 is a single wheel 80. Horizontal supports 82 and 84 rigidly fix wheel housings (72, 74) 41 inches apart so that the rollers will be engaged with the bowling lane surface 86 just inboard of the lane edges on opposite sides of the lane as shown in FIG. 3.

As is best seen in FIGS. 4 and 5, mounted to the back wall of wheel housings 72 and 74 is an I-shaped track beam 88. Slidably carried on track beam 88 for reciprocal travel therealong is a laser support guide 90. Support guide 90 has an I-shaped cavity formed therein to receive track beam 88 and maintain the guide in a constant horizontal plane while allowing the guide to move freely in the horizontal direction. Mounted to laser support guide 90 is a laser mounting bracket 92. Mounted to the top of laser mounting bracket 92 is a sensor in the form of a laser unit 94, and mounted to the bottom of laser support bracket 92 is a plunger assembly 96. Also mounted on the top of laser support bracket 92 is a belt clasp 106.

As illustrated best in FIGS. 4, 5 and 6, plunger assembly 96 includes an upright plunger 98, a coil spring 100 encircling plunger 98, a plunger block and receiving tube 102, and a transverse plunger arresting pin 104 passing through the upper end of plunger 98. Plunger 98 is slidably received withing plunger block and receiving tube 102. Plunger arresting pin 104 prevents plunger 98 from dropping out of plunger block and receiving tube 102. At its upper end spring 100 bears against block and receiving tube 102 to yieldably bias plunger 98 in the downward direction so that when the apparatus is positioned for operation the plunger head will be in contact with the top surface of bowling lane 86. The laser unit 94 shines its beam 105 down onto the top face of plunger 98 and is capable of measuring any relative change in plunger height with respect to the laser to an accuracy of 3 microns or 0.0000118 inches. Laser unit 94 preferably includes an Omron Z4M-W40RA laser displacement sensor.

Mounted to wheel housing 72 adjacent its upper end is an H-shaped in plan mounting member 108. Mounted to and extending leftwardly from member 108 are two vertically spaced, threaded bolts 110 upon which are mounted a sheave support block 112. Rotatably mounted to block 112 is a freely rotating driven cog sheave 114. Mounted to right wheel housing 74 adjacent its upper end is an H-shaped in plan support member 116. Mounted to member 116 is a laser sensor drive motor assembly 118 including a motor 120, a drive shaft 122, and a drive cog sheave 124 (FIG. 4). Laser motor drive assembly 118 is in electrical communication with controller assembly 22.

Wall 28 and wall 30 each have two slots 126 formed therein. The rearward slots 126 receive H-shaped mounting members 108 and 116 within them respectively. Forward slots 126 each allow the passage of an endless cog belt 128 therethrough. Cog belt 128 is entrained around wheel 114 and drive wheel 124 and is connected to belt clasp 106 on guide 90 associated with plunger assembly 96. When laser motor drive 120 turns drive wheel 124, belt 128 is driven linearly, causing laser support guide 90 to move the laser assembly and plunger assembly 96 horizontally across the bowling lane. Displacement of the laser assembly and plunger assembly horizontally across the bowling lane is measured by a photoelectric sensor of the same type as photoelectric sensor 60 described above detecting the rotation of a notched wheel similar to notched wheel 58 described above. Front wall 26 has a pair of wheel supports 130 and 132 attached thereto with lane-engaging wheels 134 and 136 rotatably mounted therein respectively. Also attached to front wall 26 is a handle 138.

Crosswise tilt measurement assembly 18 is disposed between divider wall 40 and front wall 26. Assembly 18 includes a transverse mounting beam 140, which is attached to the top at its opposite ends of wheel housings 72 and 74. Mounted to the top of beam 140 is a sensor in the form of digital level 142, which is in electrical communication with controller assembly 22. Digital levels 66 and 142 are preferably Wyler model Clino 2000 digital levels which are accurate to 0.0001 inches.

As best seen in FIG. 3, an outboard, inwardly extending and spring-biased, conically shaped, guide wheel 144 is provided. Similarly, wheel housing 74 includes an outboard, inwardly extending and spring-biased, conically shaped, guide wheel 146. Guide wheels 144 and 146 are positioned to engage the respective lane edge surfaces of a bowling lane in order to keep apparatus 10 centered on the lane.

Controller assembly 22 includes a programmable logic controller (PLC) that controls the operation of the lane mapper. The PLC controls the motors and receives signals from each of the sensors. The sensory information received by the PLC includes the distance the lane mapper has traveled down the bowling lane and the bowling lane surface information sensed by the lane mapper, including the lengthwise and crosswise tilt and the lane surface height with respect to the laser. The distance traveled information is used both in controlling the motion of the lane mapper and as a reference when recording lane surface characteristic information. In addition to the PLC, the controller assembly includes an on-board memory for temporarily storing the measurements made by the lane mapper. The controller assembly is connected by an interface to a laptop computer (not shown) that may be placed on top of the lane mapper. In a preferred embodiment the laptop computer has a software program based on the Windows Operating System that provides an interface between a user and the lane mapper. The PLC receives instructions from the laptop over the interface and controls the uploading of the result information from the lane mapper to the laptop computer. The software running on the laptop can then present the results in various formats as described further below.

Figure 9:
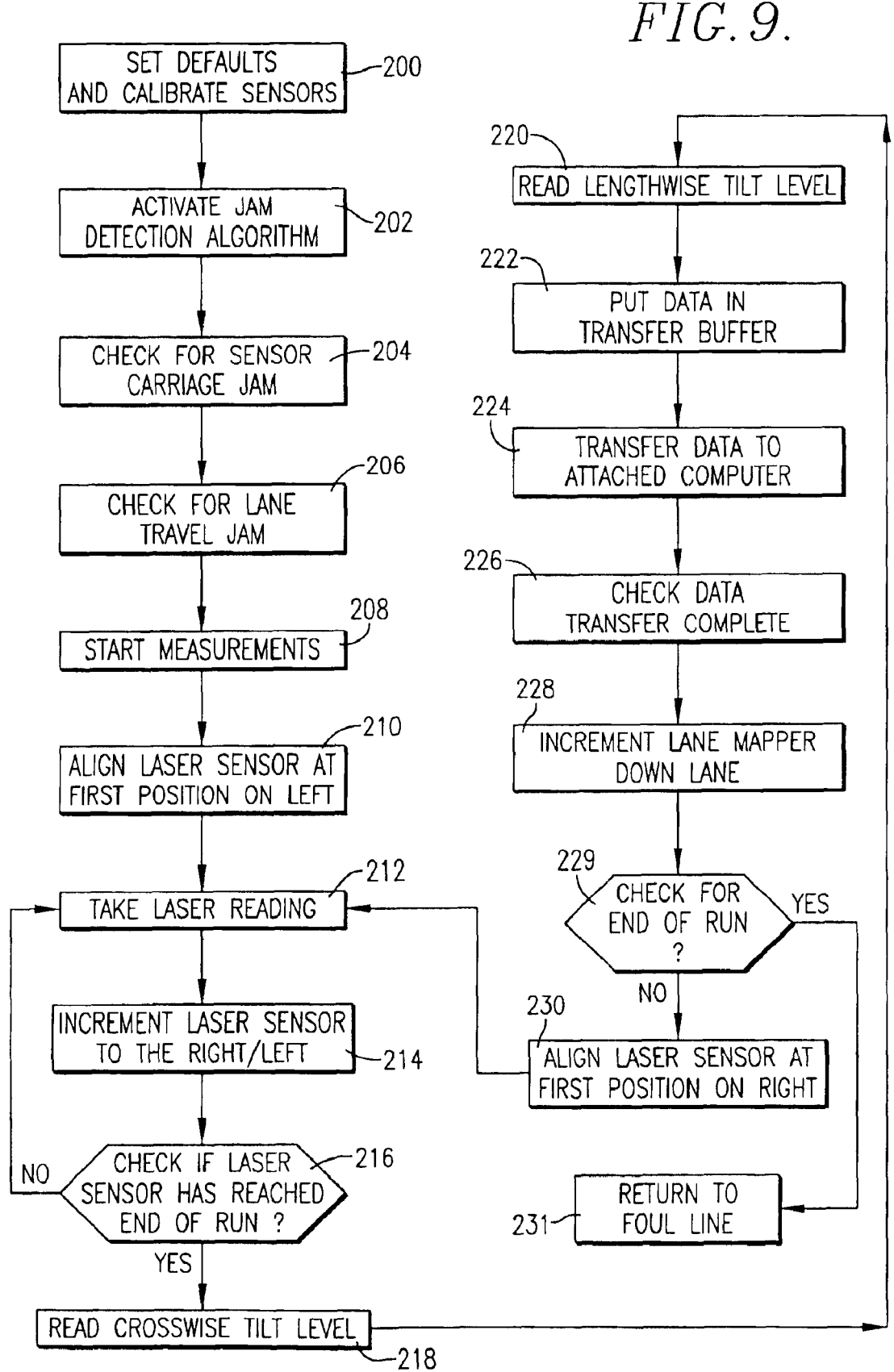
FIG. 9 is a flow diagram showing one embodiment of a computer program for driving the preferred embodiment of the lane mapper of the present invention.

Operation of the lane mapper will now be described in conjunction with FIG. 9, a flow diagram of one embodiment of the control logic employed in the present invention. Although the preferred embodiment employs a programmed PLC, this flow logic may be embodied in a computer program, in a programable logic chip, in custom designed hardware, or in some combination of the above.

The flow diagram starts at step 200 where default values and user selected values are loaded into the controller, and the sensors on the machine are calibrated and checked for proper operation. The user selected values are entered into a software program in the laptop that is in communication with the PLC. The user can set the number of steps or locations where the lane mapper will take readings. The user can also set the distance between lane-surface height measurements within each step, the distance between steps, the distance between crosswise tilt measurements, and the distance between lengthwise tilt measurements. At step 202 the jam detection algorithm is activated. The jam detection algorithm will run continuously in the background throughout operation of the lane mapper to check that the laser sensor and machine are operating correctly. At step 204 the machine checks for a sensor carriage jam which will have occurred if the laser support guide 90 is not moving properly. At step 206 the controller checks for lane travel jam by checking for certain patterns in the motor sensor data or photoelectric sensor 60 data which indicate a jam has occurred.

Once the sensors have been calibrated and the jam detection algorithm has been activated, measurements may begin at step 208. This process starts with the controller aligning the laser sensor at the first position on the left at step 210. Once the laser sensor is aligned, a reading of the lane height is taken and stored at step 212. At step 214 the laser sensor is incremented to the right by the programed increment amount. The default value in the preferred embodiment is ½" increments, but this maybe changed. When the measurement process begins the lane height measurements are made by incrementing the laser and plunger from left to right. After the laser sensor has been incremented, the controller will check at step 216 to determine if the laser sensor has reached the end of its run. If the laser sensor has not yet traversed the width of the lane, control returns to step 212 where another laser reading is taken and the process repeats. If the laser sensor has reached the end of its run, control proceeds to step 218 where the crosswise tilt of the lane is measured by reading the crosswise tilt digital level. "Control then proceeds" to step 220 where lengthwise tilt is read by reading the lengthwise tilt digital level.

Once a step measurement has been completed and the crosswise and lengthwise tilt have also been recorded, the controller moves the recorded data from the memory into a transfer buffer at step 222. At step 224, the data is transferred to an attached computer, which in the preferred embodiment is a laptop computer. The controller then determines whether the data transfer is complete at step 226 before proceeding to step 228 where the lane mapper is incremented lengthwise down the lane to the next step for the next set of measurements. At step 229 the program checks to determine if the lane mapper has reached the end of its measurement run down the lane. If yes, the program proceeds to step 231 where the controller causes the lane mapper to return to the foul line. If the lane mapper has not reached the end of its run, the controller proceeds to step 230. Because the laser sensor is all the way to the right, the second step lane height measurements will be made from right to left. As the lane mapper increments down the lane from step to step, the laser sensor runs alternate so that runs on odd increments are from left to right and runs on even increments are from right to left. After the lane mapper has been incremented one step down the lane, the laser sensor is aligned at the first position on the right at step 230. This process is identical to that described for step 210, except that it is performed on the right. Program flow then returns to step 212, the beginning of the laser reading loop where the laser measurements are taken until the entire lane width has been measured as previously described.

Resident in the laptop computer is a user interface program that provides a graphical user interface that allows the user to programmably select measurement settings including the distance between steps down the bowling lane, the distance between lane height measurements within each step, and the distance between and frequency of lengthwise and crosswise tilt measurements. The program also stores measurement data transferred by the PLC to the laptop in a database. The database records the lane measurements and also records the facility and lane number to which the measurements refer. The software allows the user to view the lane measurements either as numerical outputs or in a graphical format. The graphical format can take the form of a two-dimensional graph showing the cross section of lane height measurements for a particular step and also may be displayed as a three-dimensional graph showing lane height measurements for an entire bowling lane.

Figure 10:
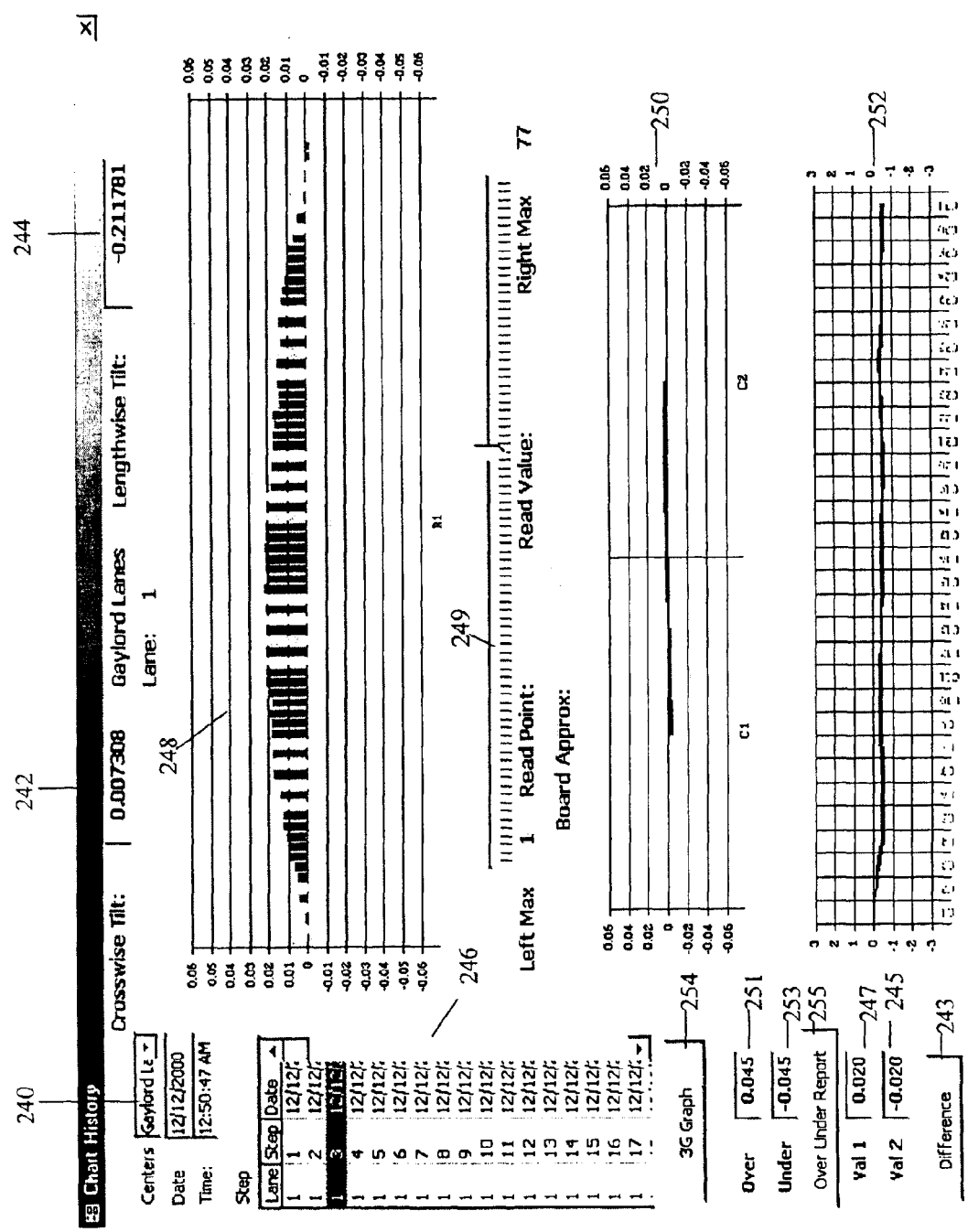
FIG. 10 is an example graphical display capable of being produced by one embodiment of the present invention.
Figure 11:
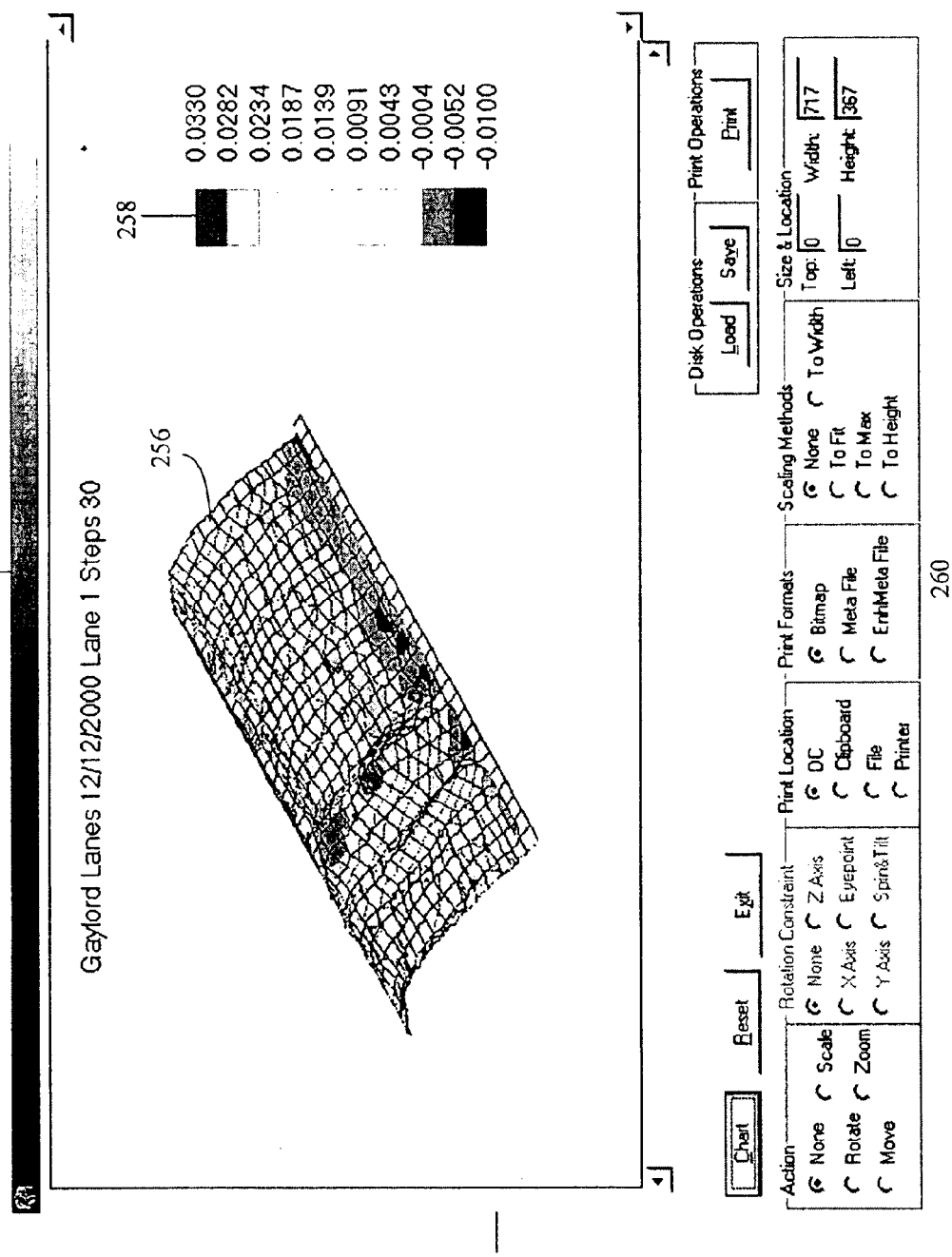
FIG. 11 is an example three-dimensional graphical display capable of being produced by one embodiment of the present invention.

FIG. 10 shows an example graphical display of the data recorded by the lane mapper generated by the user interface program. In FIG. 10 the user can select the bowling lane center he wishes to view data from by using the drop down menu 240. Menu 246 allows the user to select from each step of data taken for a particular lane on a given date. The user may select the step to be displayed by highlighting the entry desired. Once the center and lane have been selected, the user interface program populates the chart with the relevant data. This data includes a numeric presentation 242 and 244 of the crosswise and lengthwise tilt respectively. Graph 248 displays the data for a cross section of the lane surface height at one step in graphical format. Sliding scale control 249 allows the user to select the particular reading within a step to be displayed on the screen. Graph 250 shows the crosswise tilt for the selected step and graph 252 shows the overall lengthwise tilt for the entire lane from front to back. Button 254 causes the user interface program to create a three dimensional graph of the entire selected bowling lane such as is shown in FIG. 11. Over box 251 and under box 253 allow the user to enter the values that filter the report to exclude measured values between the limits set by the over value and under value. Thus any single read that is over or under the user entered values will be displayed on the report. These values are typically the American Bowling Congress maximum tolerance specifications for crowns and depressions. Thus, this report shows any reads that are not within the tolerance range. The report is displayed by setting the over and under values and then clicking on the over under report button 255. Difference button 243 activates the generation of a report that will identify holes or hills on the lane for an area of 10 reads within a single step, which is approximately equivalent to the width of 5 boards in the lane. The user can input values into Val 1 Box 247 and Val 2 Box 245. The difference report will show any values within the 5 board area outside of the ranges entered in the Val 1 and Val 2 boxes.

In FIG. 11 the three dimensional display 256 gives a view of the lane surface for the entire lane based on the data that was stored from a lane mapper run. The graph may be displayed in color and key 258 shows the elevation associated with each region on the three dimensional graph 256. The bottom of FIG. 11 includes a region 260 in which the user may make selections regarding the display, printing, and saving of the three dimensional map.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

What is claimed is:

1. An apparatus for measuring the topography of a generally flat surface comprising:
    a support adapted to be placed upon a surface to be measured;
    at least one electronic sensor assembly mounted on said support and movable relative thereto between a number of positions across said surface for measuring the elevation of the surface at each of said positions; and
    a controller mounted on said support for controlling the electronic sensor assembly and recording the electronic sensor assembly measurements,
    said sensor assembly comprising a plunger operable to contact said surface at each of said positions and movable generally toward and away from said support in response to changes in the elevation of the surface,
    said sensor assembly further comprising a laser unit operable to measure the position of the plunger.

2. The apparatus of claim 1,
    said surface comprising the surface of a bowling lane.

3. The apparatus of claim 1,
    said surface comprising the surface of a bowling lane,
    further comprising a motor on the support controlled by the controller for moving the support along the length of the bowling lane,
    the controller being capable of moving the support to preprogrammed distances along the lane.

4. The apparatus of claim 1,
    said plunger having an enlarged tip disposed for contacting the surface being measured.

5. The apparatus of claim 1,
    said support being mobile for transporting the sensor assembly and controller along the surface.

6. The apparatus of claim 5,
    further comprising a motor controlled by the controller for moving the support along the surface.

7. The apparatus of claim 1,
    further comprising a level engageable with the surface and operably connected with said controller for control thereby.

8. The apparatus of claim 7,
    said level being operable to measure crosswise tilt.

9. The apparatus of claim 7,
    said level being operable to measure lengthwise tilt.

10. The apparatus of claim 9,
    further comprising a second level operably connected with said controller for control thereby and operable to measure crosswise tilt.

* * * * *